(No Model.)
T. C. BOOTH.
OIL CAN.
No. 342,571. Patented May 25, 1886.
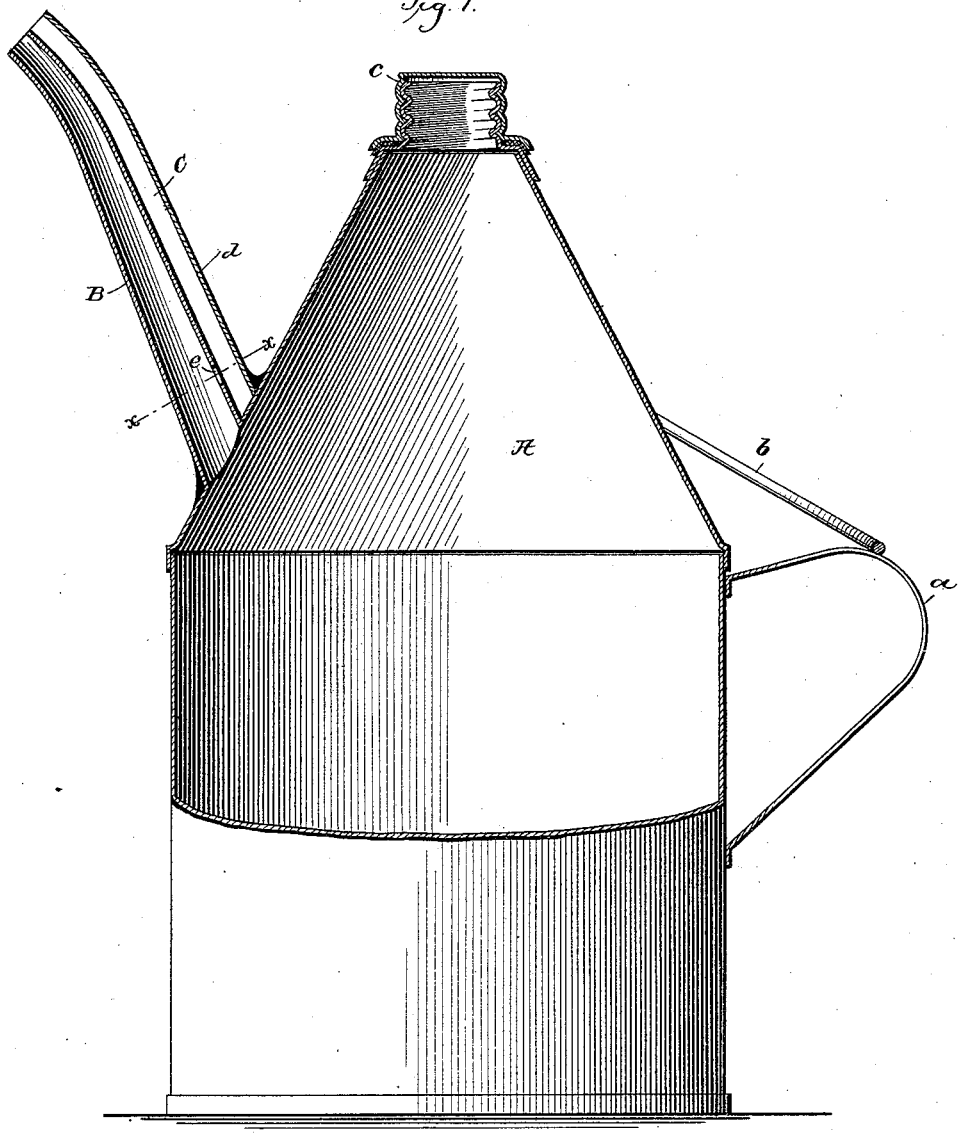
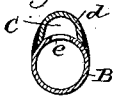

UNITED STATES PATENT OFFICE.

T. CHARLTON BOOTH, OF NEW YORK, N. Y.

OIL-CAN.

SPECIFICATION forming part of Letters Patent No. 342,571, dated May 25, 1886.

Application filed March 25, 1886. Serial No. 196,482. (No model.)

*To all whom it may concern:*

Be it known that I, T. CHARLTON BOOTH, a citizen of the United States, residing at New York, county of New York, and State of New York, have invented certain new and useful Improvements in Oil-Cans, fully described and represented in the following specification and the accompanying drawings, forming a part of the same.

This invention relates generally to oil-cans and other similar closed vessels which are used to contain liquids and from which the contents is poured as it is used.

The invention relates particularly, however, to the construction of the spout through which the liquid contents is poured in emptying the vessel.

The pouring-spout with which vessels of this class are usually provided is of comparatively small size, so as to permit the contents of the vessel to be readily poured into another vessel—as for example, a lamp having a small receiving-opening—without danger of spilling. The small size of the pouring-spout makes it necessary, in order to allow the liquid to flow out through it, to provide some means for admitting air into the vessel to prevent the formation of a partial vacuum. This has usually been done either by providing the vessel with a vent-opening especially for that purpose or by removing or loosening the stopper or cap which closed the receiving-opening. Vessels thus constructed were of course somewhat inconvenient to use, because of the necessity of always opening the vent or loosening the stopper or cap of the receiving-opening before commencing to pour; but aside from this, there was always danger if the vessel should happen to be tipped too far in the act of pouring, that some of the contents would be spilled through the vent. In using a can or other vessel thus constructed to fill a lamp or other vessel having a small receiving-opening the end of the pouring-spout is commonly inserted into the receiving-opening and the can then tipped until the contents flows out through the spout. When the spout is of the ordinary construction and the can is thus tipped, the contents will continue to flow until the can is empty. This makes it necessary to watch very carefully the rise of the liquid in the vessel being filled, in order to prevent it from overflowing, and this, especially when the vessel is made of opaque material, it is sometimes very difficult to do, from which it results that the oil or other liquid overflows the top of the vessel and causes annoyance and damage. These difficulties have been overcome in constructions heretofore produced by providing the pouring-spout with a longitudinal partition which extended the length of the spout and divided it into two ducts, through one of which the liquid flowed outward while air flowed inward through the other to take the place of the liquid. This construction obviated the necessity of a special vent-opening and was also of further advantage, in that as soon as the liquid in the vessel which was being filled rose so as to submerge the end of the pouring-spout, the flow of the liquid from the can would at once stop, and thus all danger of overflowing the vessel being filled was avoided. These same results have also been accomplished in constructions heretofore produced by providing a small vent-tube, which extended from a point at the side of the mouth of the spout to some point within the can. While the results produced by these constructions are satisfactory the constructions themselves are not entirely so, because of the difficulty and expense attending their production.

It is the object of the present invention to provide a construction which, while possessing all the advantages of those heretofore mentioned, shall be capable of production at a much less cost.

As a full understanding of the invention can be best given by a detailed description of a vessel embodying the same, such description will now be given, reference being had to the accompanying drawings, in which—

Figure 1 is an elevation, partly in section, of an ordinary oil-can constructed according to the present invention, and Fig. 2 a cross-section of the pouring-spout taken upon the line *x x*.

Referring to said figures, it is to be understood that A represents an ordinary oil-can, such as is commonly used for holding kerosene-oil. This can is provided with the usual handle, *a*, bail *b*, and screw-cap *c*, which closes the receiving-opening, and also with a pouring-spout, B, which is of substantially the usual shape and size. This spout, however, instead of being a simple tube is provided upon its upper side with a U-shaped strip, d, which extends from the end of the spout to the point where the spout is joined to the body of the can, as shown in Fig. 1, and is soldered along its edges to the spout, as shown in Fig. 2. By this means the spout B is provided in a very simple and inexpensive manner with a duct, C, which extends from the end of the spout to the point of its union with the body of the can. The duct C, instead of communicating with the interior of the can, communicates with the spout B by means of a small opening, e, located near the base of the spout.

To pour from a can having a spout thus constructed it is only necessary to remove the usual cap (not shown) which covers the end of the spout. By then tipping the can to the proper degree the liquid contents will flow out through the spout in a steady and uninterrupted stream, while the necessary air to prevent the formation of a partial vacuum in the can will flow in through the duct C and opening e, through which none of the liquid will flow. In filling a lamp or other vessel from a can thus constructed it is only necessary, in order to avoid all danger of overflowing it, to insert the end of the spout B for a short distance into the vessel. No attention need then be paid to the rise of the liquid in the vessel being filled, because as soon as the liquid rises so as to immerse the end of the spout the flow from the can will at once stop.

It will readily be seen that the construction herein shown is much simpler and more economical than those heretofore produced for attaining the same ends. It can readily be applied to cans already made, as all that is necessaay is to punch or cut the small hole e in the top of the spout and then solder the U-shaped piece d along the top of the spout.

What I claim is—

The vessel A, having the pouring-spout B, the latter being provided with the air-duct C, extending along its top and communicating with the spout through the opening e in the top of the latter, substantially as described.

In testimony whereof I have hereunto set my hand in the presence of two subscribing witnesses.

T. CHARLTON BOOTH.

Witnesses:
JAS. J. KENNEDY,
T. H. PALMER.